United States Patent
Husak et al.

(10) Patent No.: US 9,621,878 B2
(45) Date of Patent: Apr. 11, 2017

(54) VIDEO CONTROLLER FOR SYNCHRONIZING PRESENTATION OF A PLURALITY OF IMAGES PROJECTED ONTO A DISPLAY

(71) Applicant: Lightspeed Design, Inc., Bellevue, WA (US)

(72) Inventors: Michal Husak, Ceske Budejovice (CZ); Chris Ward, Kirkland, WA (US); Robert Mueller, Kenmore, WA (US); Joesph D. Lawrence, Seatec, WA (US)

(73) Assignee: Lightspeed Design, Inc., Bellevue, WA (US)

( * ) Notice: Subject to any disclaimer, the term of this patent is extended or adjusted under 35 U.S.C. 154(b) by 159 days.

(21) Appl. No.: 14/052,672

(22) Filed: Oct. 11, 2013

(65) Prior Publication Data

US 2014/0098203 A1    Apr. 10, 2014

Related U.S. Application Data

(63) Continuation of application No. 13/305,566, filed on Nov. 28, 2011, now Pat. No. 8,556,429, which is a
(Continued)

(51) Int. Cl.
*H04N 13/04*    (2006.01)
*G03B 33/00*    (2006.01)
(Continued)

(52) U.S. Cl.
CPC ......... *H04N 13/0429* (2013.01); *G03B 33/00* (2013.01); *G03B 35/16* (2013.01);
(Continued)

(58) Field of Classification Search
CPC .......... H04N 13/0429; H04N 13/0434; H04N 13/0436; H04N 13/0438; H04N 13/044; G02B 27/2264; G02B 27/26
See application file for complete search history.

(56) References Cited

U.S. PATENT DOCUMENTS 6,224,216 B1 *  5/2001  Parker et al. ................... 353/31
7,072,110 B2 *  7/2006  Palovuori .......... G02B 27/2264
                                                          345/8

(Continued)

*Primary Examiner* — Bao-Luan Le
(74) *Attorney, Agent, or Firm* — Patrick J. S. Inouye; Krista A. Wittman

(57) ABSTRACT

A video controller for synchronizing presentation of a plurality of images is provided. A color switching device is operable to continually select a color out of a set consisting essentially of a plurality of fundamental colors. Each fundamental color is selected for presentation for a fixed time segment. A light processing element is operable to block and permit transmission of light in each color selected by the color switching device during each fixed time segment. The light includes at least two streams of sequential images. A synch signal generator is in control of the light processing element and is configured to time presentation of the light by the light processing element and of control signals to a viewing device of the display. The presentation of the light and of the control signals is timed in synchrony with the fixed time segments only during a transition state of the viewing device.

24 Claims, 13 Drawing Sheets

Related U.S. Application Data continuation of application No. 11/511,588, filed on Aug. 28, 2006, now Pat. No. 8,066,377.

(51) Int. Cl.
*G03B 35/16* (2006.01)
*G03B 35/24* (2006.01)
*H04N 9/31* (2006.01)

(52) U.S. Cl.
CPC ............. *G03B 35/24* (2013.01); *H04N 9/312* (2013.01); *H04N 9/3114* (2013.01); *H04N 13/044* (2013.01); *H04N 13/0427* (2013.01); *H04N 13/0434* (2013.01); *H04N 13/0436* (2013.01); *H04N 13/0438* (2013.01); *H04N 13/0459* (2013.01); *H04N 13/0497* (2013.01)

(56) References Cited

U.S. PATENT DOCUMENTS

| | | | |
|---|---|---|---|
| 7,180,554 B2* | 2/2007 | Divelbiss | G02B 26/008 345/6 |
| 7,234,821 B2* | 6/2007 | Wang | 353/97 |
| 7,559,653 B2* | 7/2009 | Silverstein | 353/7 |
| 2003/0112507 A1* | 6/2003 | Divelbiss | G02B 26/008 359/464 |
| 2004/0233527 A1* | 11/2004 | Palovuori | G02B 27/2264 359/464 |
| 2005/0237487 A1* | 10/2005 | Chang | G03B 35/16 353/7 |
| 2006/0077358 A1* | 4/2006 | Wang | 353/97 |
| 2007/0132953 A1* | 6/2007 | Silverstein | 353/7 |
| 2009/0051759 A1* | 2/2009 | Adkins et al. | 348/53 |

\* cited by examiner

VIDEO CONTROLLER FOR SYNCHRONIZING PRESENTATION OF A PLURALITY OF IMAGES PROJECTED ONTO A DISPLAY

CROSS-REFERENCE TO RELATED APPLICATION

This non-provisional patent application is a continuation of U.S. Pat. No. 8,556,429, issued Oct. 15, 2013, which is a continuation of U.S. Pat. No. 8,066,377, issued Nov. 29, 2011, the priority dates of which are claimed and the disclosures of which are incorporated by reference.

FIELD

This invention relates in general to systems and methods for synchronizing a 3D video projector and in particular to a video controller for synchronizing presentation of a plurality of images projected onto a display.

BACKGROUND

Two dimensional video projectors have been widely available for many decades. Recently, three dimensional (3D) stereoscopic video projectors have been developed that produce flickerless 3D stereoscopic images in part by increasing the video projector's operating frequency from approximately 60 frames per second (FPS) to approximately 85 FPS and beyond. This higher frame rate is important because rates below 85 FPS can give the impression of excessive flickering to the viewer.

As shown in FIG. 1, in order to view the images from a 3D stereoscopic video projector 12 connected to an image source 11, special optical devices may be used and/or special eyewear may be worn by the viewer, such as a pair of liquid crystal (LC) shutter-based glasses 13. Such glasses 13 include shutters 14A, 14B that cover the user's eyes and alternately transition between clear and opaque via a shutter control signal, generally referred to as 22. A video signal 20 is delivered from the image source 11 to the video projector 12 which then controls the production and delivery of the images 18, 19 synchronously with the shutters 14A, 14B so that only the left eye is presented a left eye image 18 and the right eye is presented a right eye image 19.

As shown in FIG. 2, other 3D stereoscopic video projector systems are found in the prior art that utilize a polarization flipping device 16 to alternate the polarization of light exiting the video projector 12. An example of a polarization flipping device is one sold by Real D, Inc. of Beverly Hills, Calif. under the trademark Z SCREEN. The video projector 12 is connected to an image source 11, and projects an image (designated 18, 19) through a polarization flipping device 16 and onto a polarization preserving screen (not shown) which is watched by a viewer wearing passive polarized eyewear 17. The image source 11 sends a flipping device control signal 22' to control the flipping device 16.

Recently, semiconductors, called digital light processors or digital micro-mirror devices (DMDs) (Texas Instruments, Inc. sells a digital light processor under the trademark DLP) have been developed to manipulate light digitally. DMDs act as light switches consisting of up to and beyond 1.3 million microscopic mirrors, each of which is able to tilt back and forth up to 5,000 times per second. In 3D stereoscopic video projector systems the movement of the DMD is coordinated with the projector's light source, and with the video or graphic signals transferred to an eye-switching device to produce seamless images to the viewer. Today, 3D video projectors with three DMDs are relatively common with a single DMD being assigned to one of three critical colors. Unfortunately, such 3D video projectors are relatively expensive.

Another type of 3D video projector utilizes a single DMD. While 3D video projectors with a single DMD are less expensive than 3D video projectors with three DMDs, they also employ a color wheel divided into several color segments which filter the white light from the projector's light source into specific colors which are passed in succession onto the single DMD. A color sequencing firmware, (hereinafter referred to as firmware) is also employed to control the operation of the single DMD.

3D video projector systems used with LC shutter glasses 13 must use an eye-switching signal 22 to synchronize the eyewear's shutters 14A, 14B. This eye-switching signal 13 is typically generated externally from the video projector, for instance at the image source 11 as shown in FIG. 1. Thus when used with single DMD projectors, the eye-switching signal 22 is indirectly synchronized with the projector's color wheel. As the color wheel spins during operation, the eye-shutters on the glasses 13 quickly alternate to create transparent and opaque periods. Unfortunately, the transition between the transparent and opaque periods is not instantaneous which reduces the overall quality of the image seen by the viewer. For example, when the transition period occurs during the Red color segment, some of the time normally required to complete a full Red duty cycle may be lost, causing the Red color in the image to appear weak. It is especially problematic when presenting human faces which appear noticeably pale or lifeless. This transition either between transparent and opaque periods or between opaque and transparent periods shall be referred to as the "unstable transition phase." While adjustments could be made to the video projector to move the problem from one color segment to another, the problem, heretofore, has not been resolved.

SUMMARY

It is an object of the present invention to provide an improved system and method for producing higher-quality 3D stereoscopic images from a 3D video projector.

It is another objective of the present invention to provide such a system and method that addresses the image quality problems associated with a 3D video projector utilizing a single DMD.

These and other objects are addressed by the system and method disclosed herein specifically intended to be used with a video projector that includes a color switching device, such as a color wheel, and a light processing element, such as a single DMD. The light processing element transmits or blocks the light from the color switching device. While the preferred embodiment of the invention uses a color wheel as a color switching element and a single DMD as a light processing element, the invention should not be construed as being limited to these structures. For example, the color switching device can also be LED, Laser diode, and OLED-related components that are designed to produce at least three separate (Red Blue and Green) colors. The light processing elements can include LCD elements and other displays products such as those sold by Three Five Systems, Inc. of Tempe Ariz., under the trademark LCOS and display products sold by Victor Company, Ltd or Yokomoto, Japan under the trademark D-ILA.

In the preferred embodiment, a color wheel is used which is divided into at least one Red segment, at least one Blue segment, and at least one Green segment, which are referred to as 'critical color segments' because together they represent the fundamental colors required to create a white balance. The color wheel may include other color, clear or opaque segments called non-critical segments. Some non-critical segments may be transmissive such that they allow transmission of light through the color wheel. Such transmissive non-critical segments include clear segments, White segments, and all other color segments except black. Black segments and segments covered by a physical barrier are known as non-transmissive and act to block the transmission of light through the color wheel during operation. Different color wheels are shown herein that include various combinations of the three critical color segments listed above along with one or more non-critical segments located or electronically created at different locations on the color wheel.

The system includes accompanying firmware that controls the projection of light from the projector to an eye-switching device so that the transmission of light from the projector is momentarily discontinued during the eye-switching device's unstable transition phase. When the color switching device is a color wheel, a transmissive non-critical segment located on the color wheel is presented in front of the projector's lamp during the eye-switching device's unstable transition phase. In another embodiment of the color wheel, at least one non-transmissive non-critical element is created that block light from the projector altogether when presented. In still another embodiment of the color wheel, the non-critical segment is eliminated from the color wheel and a modified version of the firmware is used that controls the DMD so that it momentarily discontinues illumination during the device's unstable transition phase. In every embodiment of the color wheel disclosed herein, the duration of the physical or non-physical, non-critical segment must be sufficient to mask the unstable transition phrase.

The type of firmware used depends on the type of color wheel and the type of eye-switching device used to view 3D images. When a compatible color wheel, firmware and eye-switching device are used and when a non-critical segment is presented in front of the projector's lamp, all of the light from the projector is either passed on or blocked out. The firmware controls the emission of light from the projector and the timing of the color sequencing matched with a particular color wheel, so that a non-critical segment is passed over and the light from the projector is momentarily discontinued during the unstable transition phase. In this manner, the color fading or deteriorating defect commonly experienced with 3D single digital light processing video projectors found in the prior art is substantially reduced or eliminated altogether.

In an alternative embodiment, a projector and color switching device is used but the firmware to modify control of the DMD is replaced or supplemented by an eye-switching adjusting device or program installed or loaded into the image source or intermediate device located between the image source and the projector. The image timing hardware and/or firmware modifies the shutter or flipping device control signal to the eye-switching device so that the unstable transition phase occurs during a non-critical segment of the color switching device and modifies the image source in order to control the production and delivery of the images synchronously with the shutters.

In addition to controlling the timing of the color sequence, the firmware controls the video projector's speed so that it operates at approximately 85 FPS or higher which is needed to perceive flickerless images. In the preferred embodiment, the video projector operates at approximately 120 FPS A further embodiment provides a video controller for synchronizing presentation of a plurality of images projected onto a display. A color switching device is operable to continually select a color out of a set consisting essentially of a plurality of fundamental colors. Each fundamental color is selected for presentation on the display for a fixed time segment. A light processing element is coupled to the color switching device and is operable to block and permit transmission of light in each color selected by the color switching device on to the display during each fixed time segment. The light includes at least two streams of sequential images. A synch signal generator is in control of the light processing element and is configured to time presentation of the light by the light processing element onto the display and of control signals to a viewing device of the display. The presentation of the light and of the control signals is timed in synchrony with the fixed time segments only during a transition state of the viewing device.

A still further embodiment provides a video projector for synchronizing presentation of a plurality of images projected onto a display. An image source includes at least two streams of sequential images. A color switching device is operable to continually select a color out of a set consisting essentially of a plurality of fundamental colors. Each fundamental color is selected for presentation on the display for a fixed time segment. A light processing element is interposed between the image source and the color switching device and is operable to block and permit transmission of the light received from the image source in each color selected by the color switching device on to the display during each fixed time segment. The light includes the at least two streams of sequential images. A synch signal generator is in control of the light processing element and is configured to time presentation of the light by the light processing element onto the display and of control signals to a viewing device of the display. The presentation of the light and of the control signals is timed in synchrony with the fixed time segments only during a transition state of the viewing device. The transition state includes an interval occurring between a state permitting viewing of the display and a state preventing viewing of the display.

A yet further embodiment provides a video projection display system for synchronizing presentation of a plurality of images projected onto a display. A display includes a screen surface suitable for presentation of images. A video projection unit is configured to control production and delivery of the images on the display. An image source includes at least two streams of the images ordered into a sequence of appearance. A color switching device is operable to continually select a color out of a set consisting essentially of a plurality of fundamental colors. Each fundamental color is selected for presentation on the display for a fixed time segment. A light processing element is interposed between the image source and the color switching device and is operable to block and permit transmission of the light received from the image source in each color selected by the color switching device on to the display during each fixed time segment. The light includes the at least two streams of sequential images. A synch signal generator is in control of the light processing element and is configured to time presentation of the light by the light processing element on to the display and of control signals to a viewing device of the display. The presentation of the light and of the control signals being timed in synchrony with the fixed time segments only during a transition state of the viewing device. A wearable eye-switching device, which functions as the viewing device, is operable to obstruct and permit viewing of the display through the wearable eye-switching device in response to the control signals. The transition state includes an interval occurring between a state permitting viewing of the display through the wearable eye-switching device and a state preventing viewing of the display through the wearable eye-switching device.

DETAILED DESCRIPTION

Figure 1:
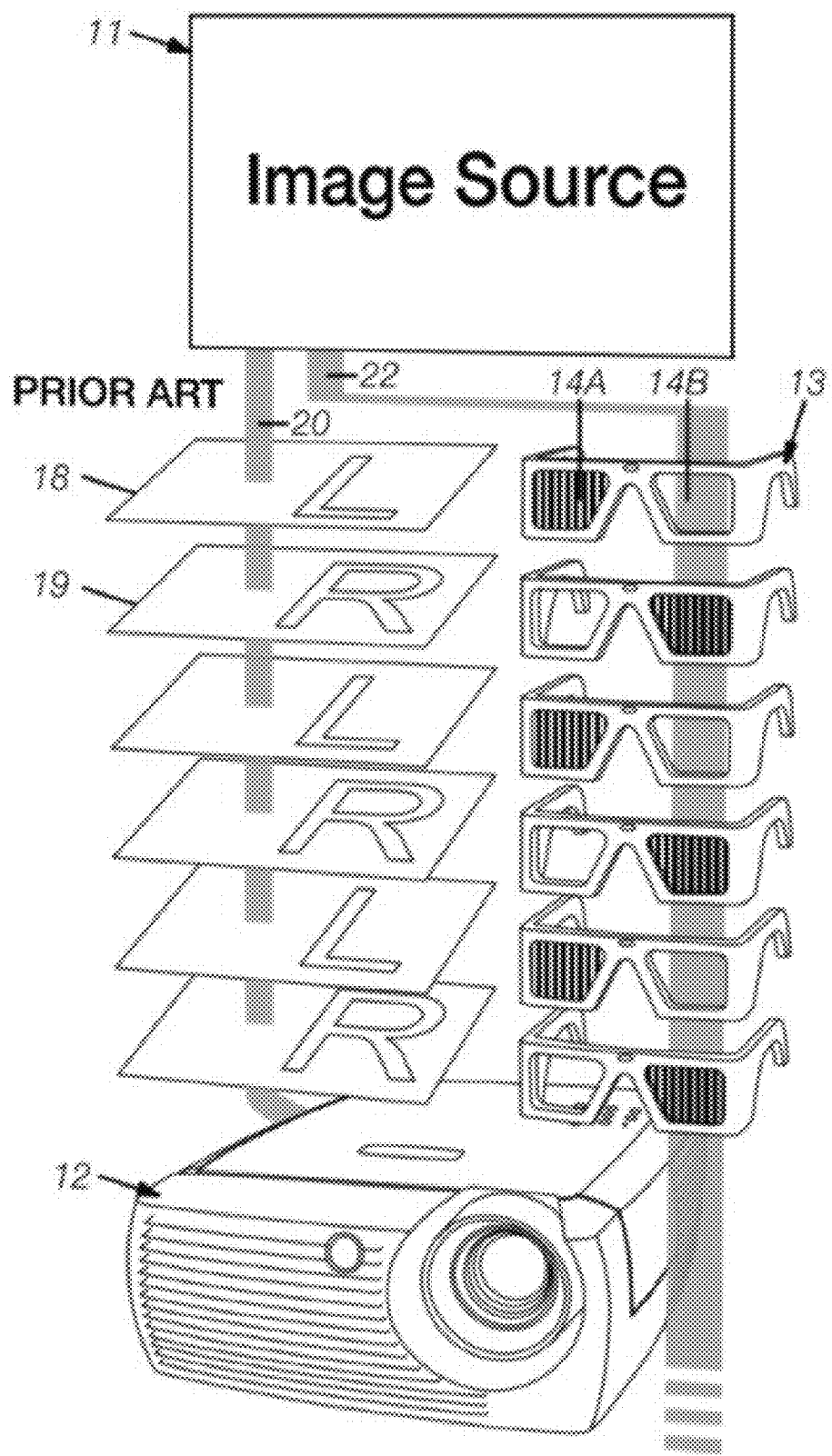
FIG. 1 is an illustration of a projected stereoscopic 3D image system used in the prior art that uses a single chip DMD-based video projector combined with LC shutter glasses and shows the left and right oriented images and the shutters being synchronized so that the viewer's right eye only sees the right-oriented image, and the left eye sees only the left-oriented image.
Figure 2:
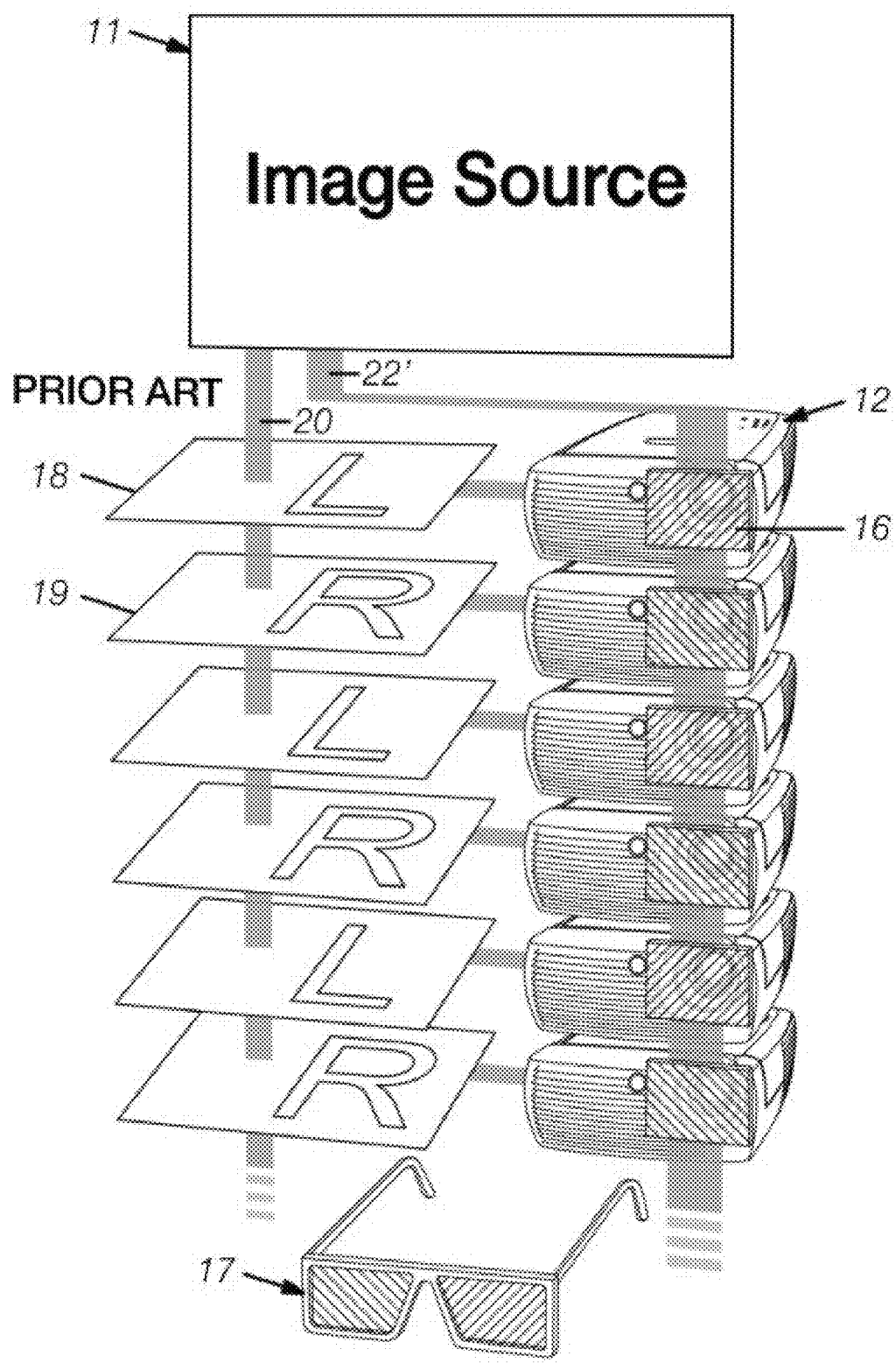
FIG. 2 is an illustration showing an alternate stereoscopic 3D projection system used in the prior art that uses the polarization-flipping device to alternate the polarization of light exiting the projector.
Figure 3:
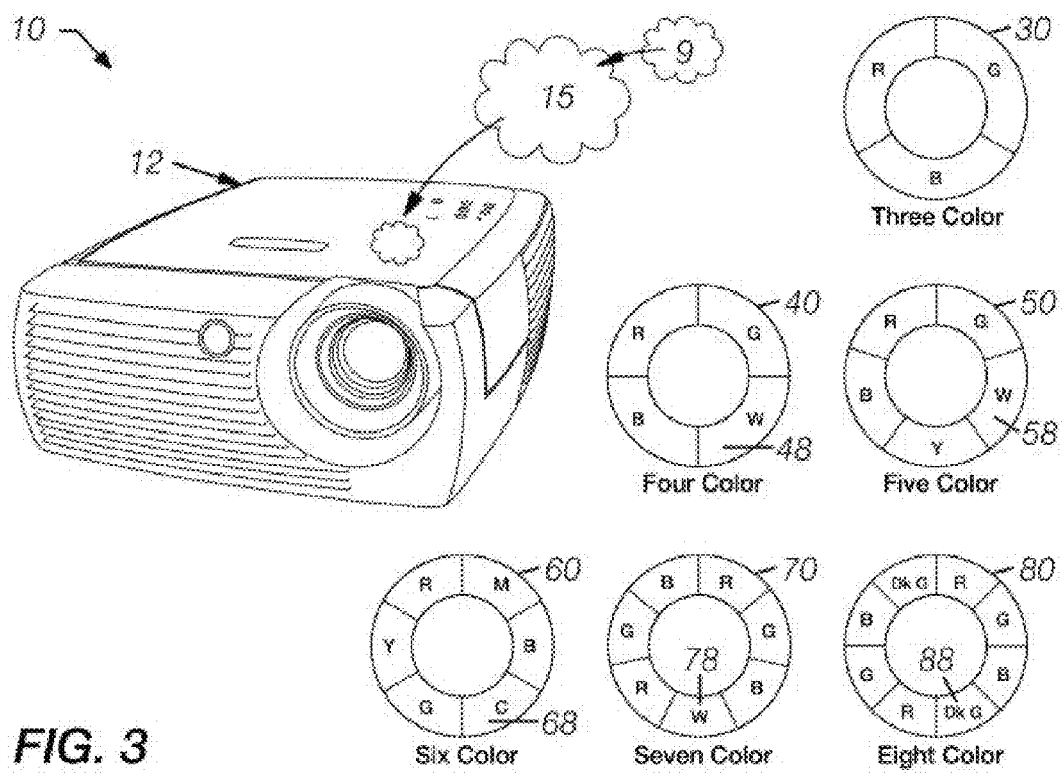
FIG. 3 is an illustration showing a video projector with resident firmware coupled or loaded into the projector's memory with either a three color, four color, five color, six color, seven color, or eight color wheel located in the projector.

Referring to the accompanying FIGS., there is shown a system, generally indicated by reference number 10 for producing higher quality 3D stereographic images from a single chip DMD video projector. Located inside the video projector 12 is a color switching device that controls the light transmitted from the projector's light source to the DMD. Referring more specifically to FIG. 3, the video projector 12 includes working memory 15 and color sequencing firmware 9. In the preferred embodiment, the color switching device is one of six, multiple color wheels (three, four, five, six, seven and eight color wheels) referenced as 30, 40, 50, 60, 70 and 80, respectively. Each color wheel 30, 40, 50, 60, 70, and 80 includes at least at least one Red segment, at least one Blue segment, and at least one Green segment, which are referred to as 'critical color segments'.

Five color wheels 40, 50, 60, 70 and 80 include a physical non-critical segment, 48, 58, 68, 78, 88 respectively, that precedes or follows the other critical color sections located thereon. There are two types of physical non-critical segments—a transmissive non-critical segment that allows light to be transmitted through the color wheel, and a non-transmissive non-critical segment that blocks or impedes light from being transmitted through the color wheel. Clear segments and all color segments except Red, Blue, Green and Black may be used as transmissive non-critical segments. Non-transmissive non-critical segments include a Black segment and any physical barrier placed on the color wheel that blocks the transmission of light through the color wheel. In the color wheels shown in the accompanying FIGS., all include the three critical color segments and some include at least one non-critical segment. With some color wheels, the firmware is used to control the DMD to block the transmission of light during a non-critical segment. With other color wheels the physical, non-critical segment has been eliminated (see color wheel 30) and the firmware electronically creates a non-critical segment at different locations on the color wheel.

As noted above, the color fading problem associated with single DMD 3D video projectors is caused by the occurrence of the eye-switching device's unstable transition phase during any critical color segment of the color wheel being used. In the first embodiments shown herein, the firmware 9 is used to control the timing of the color sequence and controls the emission of light from the video projector 12 so that a non-critical segment is passed over or is electronically inserted in the color wheel to discontinue transmission of light during the unstable transition phase. By this means the color fading or deteriorating defect commonly experienced with single DMD 3D video projectors is substantially reduced or eliminated.

The functional activities of the firmware 9 depend on the type of color wheel used. For example, when the color wheel includes a transmissive non-critical segment that has been aligned with the unstable transition phase, the firmware 9 controls the DMD so that it discontinues transmission of light from the DMD during said non-critical segment. If the color wheel includes a non-transmissive non-critical segment, the firmware 9 may or may not control the DMD to discontinue transmission of light since transmission of light through the color wheel is blocked.

In another embodiment of the system, color wheels with both critical color segments and non-critical segments are used, but the DMD is not controlled by the firmware to modify the color sequence such that a non-critical color segment is presented during the unstable transition phase. Instead, an eye switching adjusting device or program built into or loaded into the memory of the image source or located in an intermediate device controls the eye switching device generally referenced as 99 in FIGS. 6, 12-15, so that the unstable transition phase aligns in time with an eligible non-critical color and modifies the image source video data in order to deliver uniformly left- and right-oriented images synchronously with the eye-switching device.

Another important feature of the firmware 9 is that it is designed to adjust the speed of the video projector 12 so that it operates at least 85 FPS for flickerless images.

Once the firmware 9 has been loaded into the working memory 15, a color wheel similar or equivalent to one of the six representative color wheels, 30, 40, 50, 60, 70 or 80 noted above is selected and installed in the projector 12. In FIGS. 4, 5, 7-11, and 16A there are shown representative color wheels and graphs that illustrate the coordination of the timings of color sequence and the shutter signals.

Figure 4:
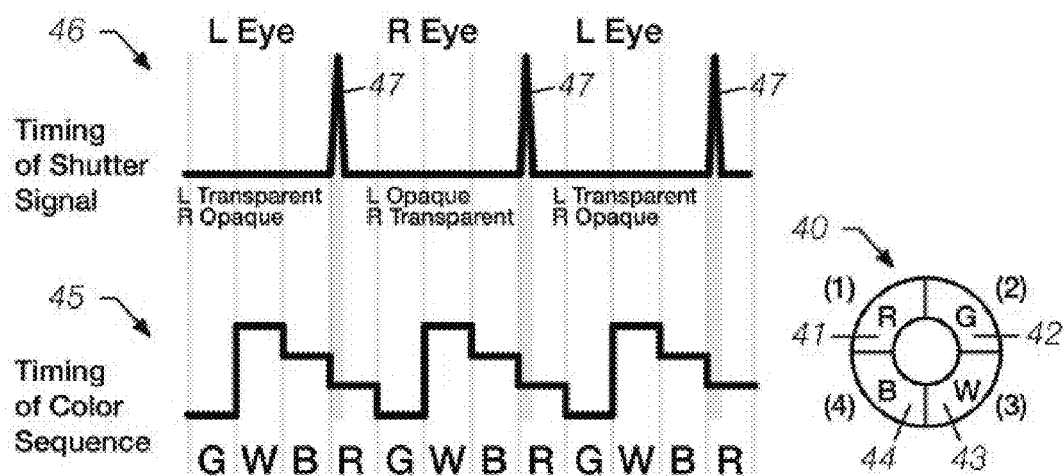
FIG. 4 is an illustration showing a four segment color wheel and the coordination of the timing of the shutter signal to the eye-switching device and the timing of the color sequence for the projector, whereby the unstable transition phase of the eye-switching device occurs at the start of the Red segment of the color wheel.
Figure 5:
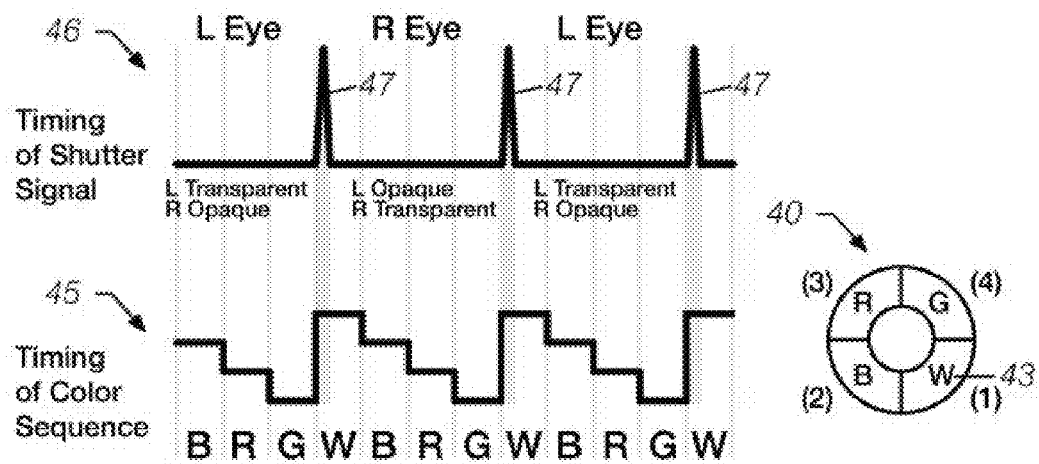
FIG. 5 is an illustration showing the same four color wheel shown in FIG. 4 with shutter timing signal and the timing of the color sequence being coordinated so that the unstable transition phase occurs when the non-critical White segment is presented.

More specifically, FIG. 4 shows a four segment color wheel 40 (Red (R) 41, Green (G) 42, White (W) 43 and Blue (B) 44 color segments). The numbers 1-4 represent the order that the color segments are displayed from 1 to 4 in a clockwise rotation. Also shown is a graph 45 of the timing of the color sequencing from the video projector 12. The actual sequence of color segments varies from projector manufacturer to projector manufacturer. Located above the timing of color sequence graph 45 is a second graph 46 that shows the timing of the shutter signal and the unstable transition phase 47 of the eye-switching device 99 used with the projector 12. With color wheel 40, without modification to the firmware controlling the color sequencing, a critical color segment, in this case the Red (R) segment 41, is shown aligning undesirably with the unstable transition phase 47 of the eye-switching device 99. This results in the color fading or deteriorating defect commonly experienced with 3D single DMD video projectors FIG. 5 is an illustration of the first embodiment showing the same four segment color wheel 40 shown in FIG. 4 with the timing of the color sequence shown in graph 45 being modified by an embodiment of the firmware 9 so that the non-critical color segment (denoted W (White) segment 43) is aligned with the unstable transition phase 47 of the eye-switching device 99. During use, the firmware 9 controls the DMD so that no light is transmitted from the projector 12 while the White segment 43 is presented.

Figure 6:
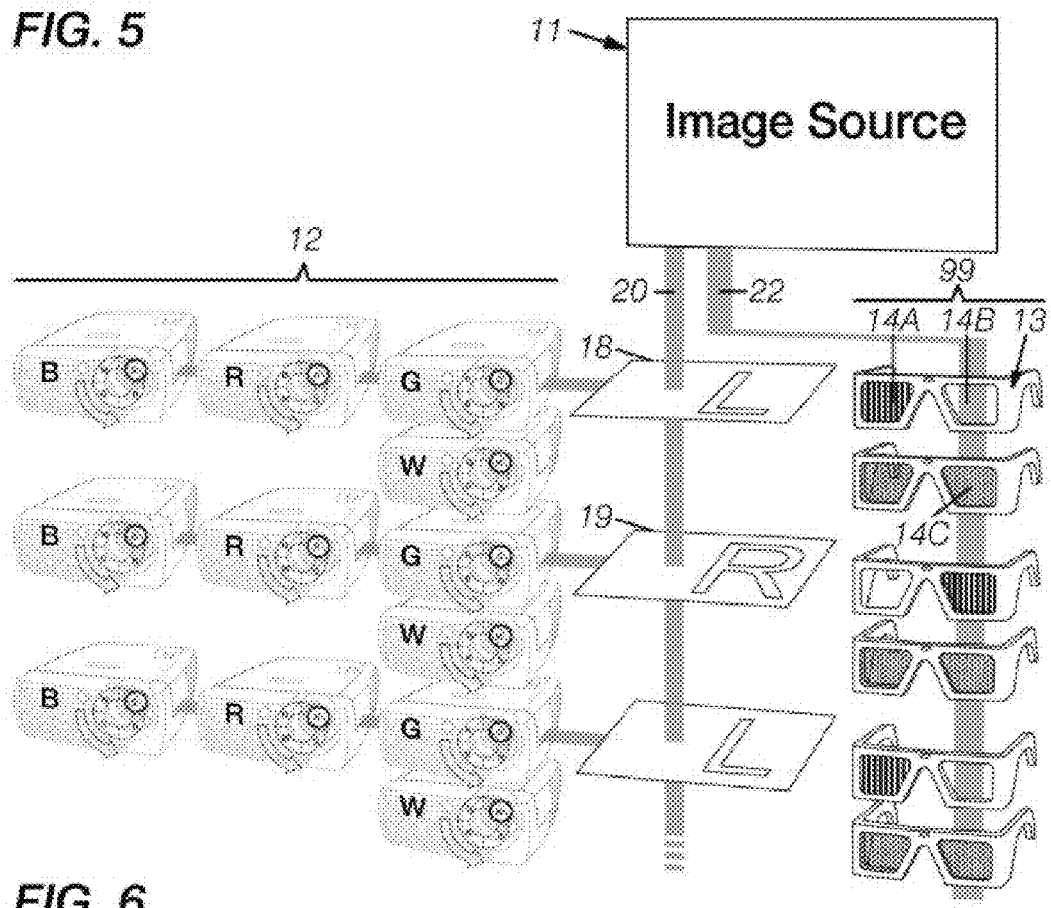
FIG. 6 is an illustration of the projector with a four segment color wheel showing the movement of the color wheel, the production of the left and right images and the coordination of the lenses of the eye-switching device being appropriately transparent or opaque during the critical color segments R, G, and B, and undergoing transition during the non-critical (White segment).

FIG. 6 is another illustration of the first embodiment showing sequential images of the video projector 12 and an eye-switching device 99 showing the left and right signals 18, 19, respectively, being transmitted to the eye-switching device 99 which is appropriately transparent or opaque during the critical color segments R, G, and B, and undergoing transition during the non-critical (White segment).

Figure 7:
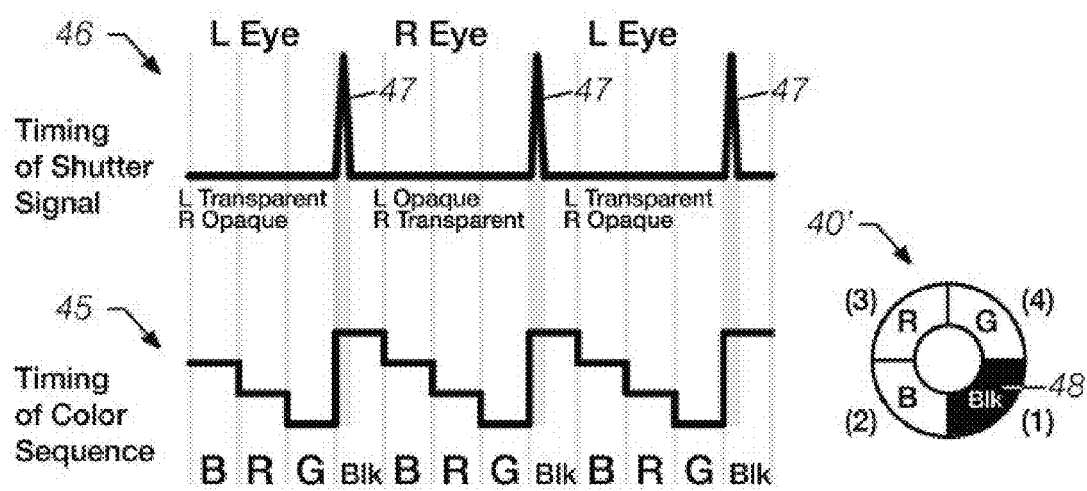
FIG. 7 is an illustration showing a four segment color wheel with a Black, non-transmissive segment and the coordination of the shutter timing signal with the timing of the color sequence so that the Black non-transmissive non-critical segment is presented with the unstable transition phase.

FIG. 7 is an illustration of a second embodiment of a four segment color wheel, designated 40' with the White segment shown in FIGS. 4 and 5 being replaced with a non-transmissive Black non-critical segment 48. As shown in the accompanying graphs 45, 46 with this color wheel 40', the timing of the color sequence is adjusted and the DMD is controlled by the firmware so that the non-transmissive Black non-critical segment 48 is aligned with the unstable transition phase 47 of the eye-switching signal. More specifically, the black non-critical segment 48 blocks transmission of light through the color wheel 40'.

Figure 8:
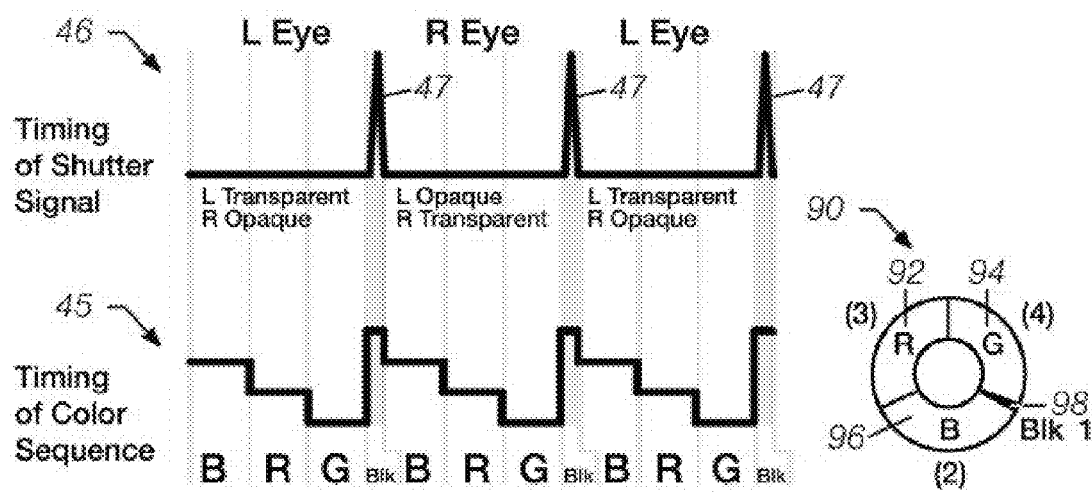
FIG. 8 is an illustration showing the coordination of the shutter timing signal and the timing of the color sequence on an alternate four color wheel that uses enlarged Red, Green and Blue segments and a narrow non-critical Black non-transmissive segment which is presented with the unstable transition phase.

FIG. 8 is an illustration of a third embodiment showing the timing of the shutter signal and timing of the color sequence and a four segment color wheel 90 that includes enlarged Red, Green and Blue segments, 92, 94, 96, and a narrow non-transmissive Black segment, 98, respectively. The firmware 9 adjusts the color sequencing so that the non-transmissive Black segment 98 is aligned with the unstable transition phase 47. In this embodiment, the color bandwidth can be redistributed to the remaining color segments to increase color precision.

It should be understood that the non-transmissive non-critical segment is not limited to a Black segment. For example, it could be a physical blocking layer, made of plastic that is laminated to the color wheel 90 capable of blocking the transmission of light.

Figure 9:
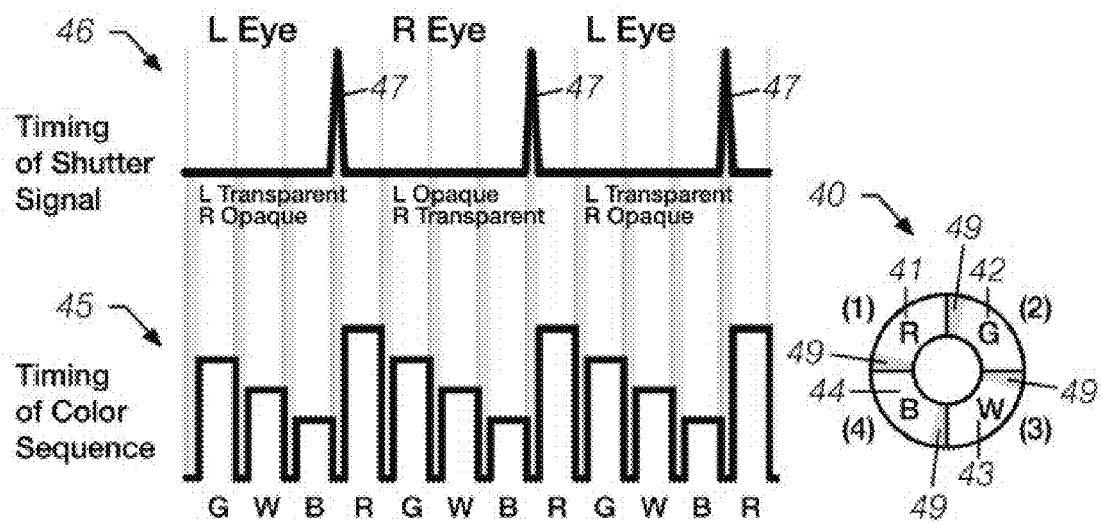
FIG. 9 is an illustration showing the coordination of the shutter timing signal and the timing of the color sequence on a four segment color wheel in which a dark sequence is electronically inserted into the image by the firmware at the start of each critical and non-critical segment and with the dark sequence located at the beginning of the Red segment being coordinated with the unstable transition phase.

FIG. 9 is an illustration showing the timing of the color sequence and timing of the shutter signal used with the four segment color wheel 40 as an example, with another embodiment of the firmware 9 being used to automatically re-define a 'dark' segment 49 at the start of each color segment 41-44. The firmware 9 controls the operation of the DMD so that one of the dark segments 49 is being coordinated with the unstable transition phase 47 (in this case the dark segment formed at the start of the Red Segment). It should be noted that with this embodiment, because a dark segment 49 is displayed between every color segment 41-44, the overall brightness of the image is diminished.

Figure 10:
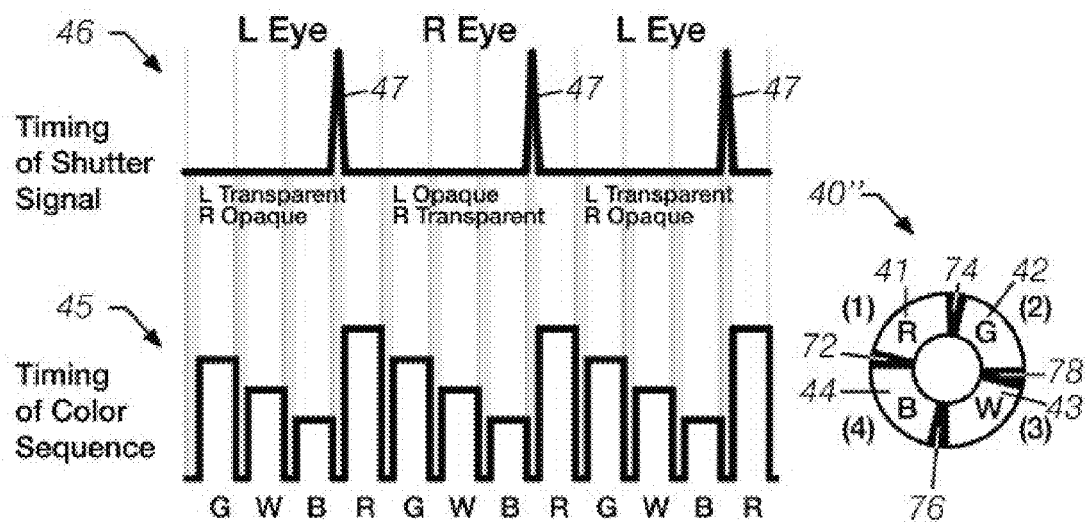
FIG. 10 is an illustration showing the coordination of the shutter timing signal and the timing of the color sequence on a five color wheel with a non-critical Black non-transmissive segment located between each critical and non-critical segment and with the non-transmissive segment located at the beginning of the Red segment being coordinated with the unstable transition phase.

FIG. 10 is an illustration of a fifth embodiment that uses an alternative five color segment color wheel 40" as an example with non-transmissive Black segments 72, 74, 76, 78 located between each color segment 41-44, respectively. As shown in the graph 45, 46 the timing of the shutter and timing of the color sequence is the same as used with the four color wheel 40 shown in FIG. 9, but with a physical Black or 'dark' non-transmissive segment being inserted between each color segment. By using physical non-transmissive segments, the contrast ratio is increased.

Figure 11:
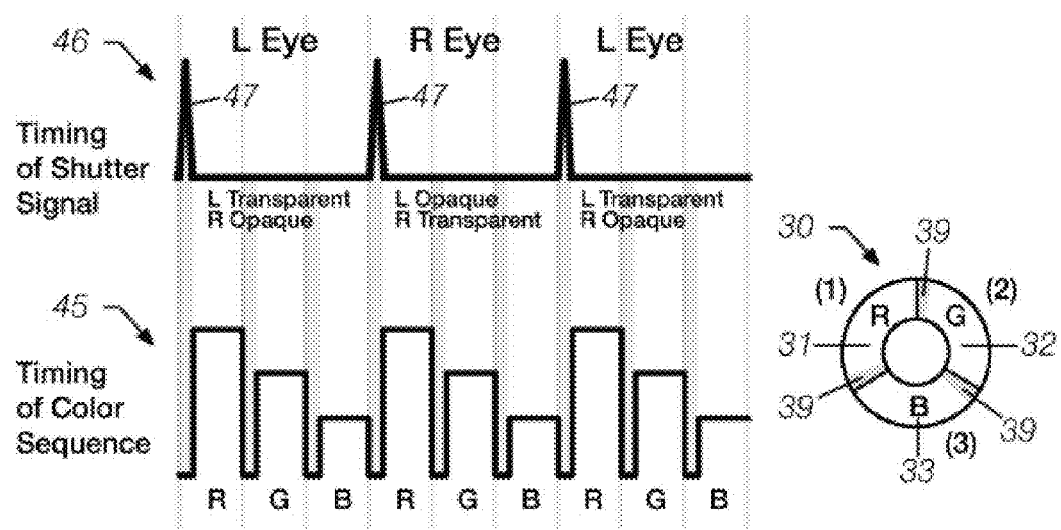
FIG. 11 is an illustration showing the coordination of the shutter timing signal and the timing of the color sequence on a three color wheel that uses three electronic dark sequences located between the three color segments with the unstable transition phase being coordinated with the dark sequence between the Blue and Red color segments.

FIG. 11 is an illustration of a sixth embodiment of a three segment color wheel 30 with Red 31, Green 32, Blue 33, wherein the color wheel 30 does not include a physical non-critical segment. With the color wheel 30 the firmware 9 inserts a 'dark' sequence 39 into a portion of every critical color segment. The firmware 9 controls the operation of the DMD so that one of the dark segments 39 is being coordinated with the unstable transition phase 47 (in this case the dark segment formed at the start of the Red Segment). The duration of the 'dark' sequence is at least equivalent to the duration of the unstable transition phase of the eye-switching device.

Figure 12:
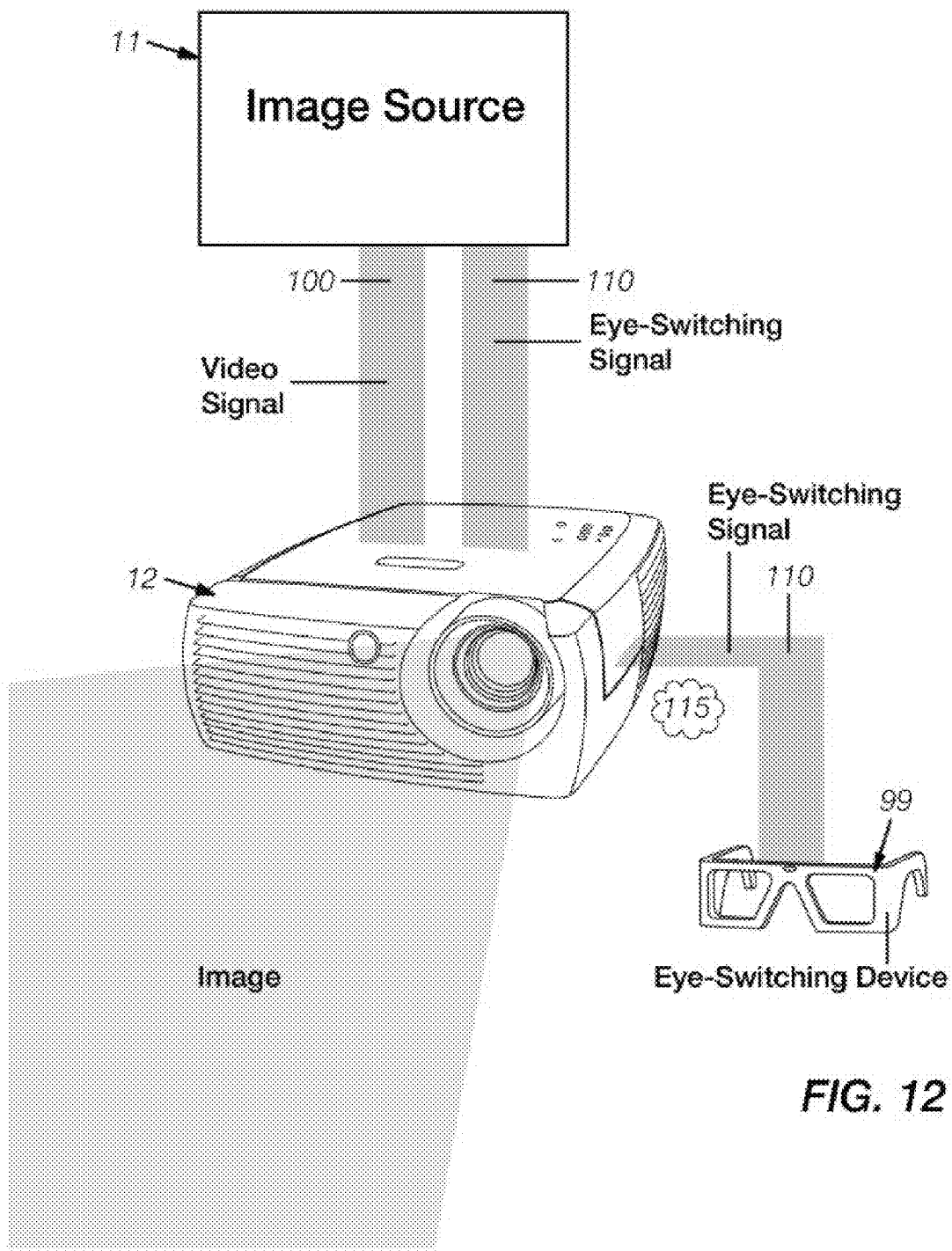
FIG. 12 is an illustration showing an image source transmitting a video signal and an eye-switching signal to the video projector. Connected to the projector is a wired or wireless transmitter which transmits an eye-switching signal to a compatible eye-switching device.

FIG. 12 is an illustration showing an image source 11 transmitting a video signal 100 and an eye-switching signal 110 to the video projector 12. Connected to the projector 12 is a wired or wireless communication means 115, which transmits an eye-switching signal 110 to a compatible eye-switching device 99.

Figure 13:
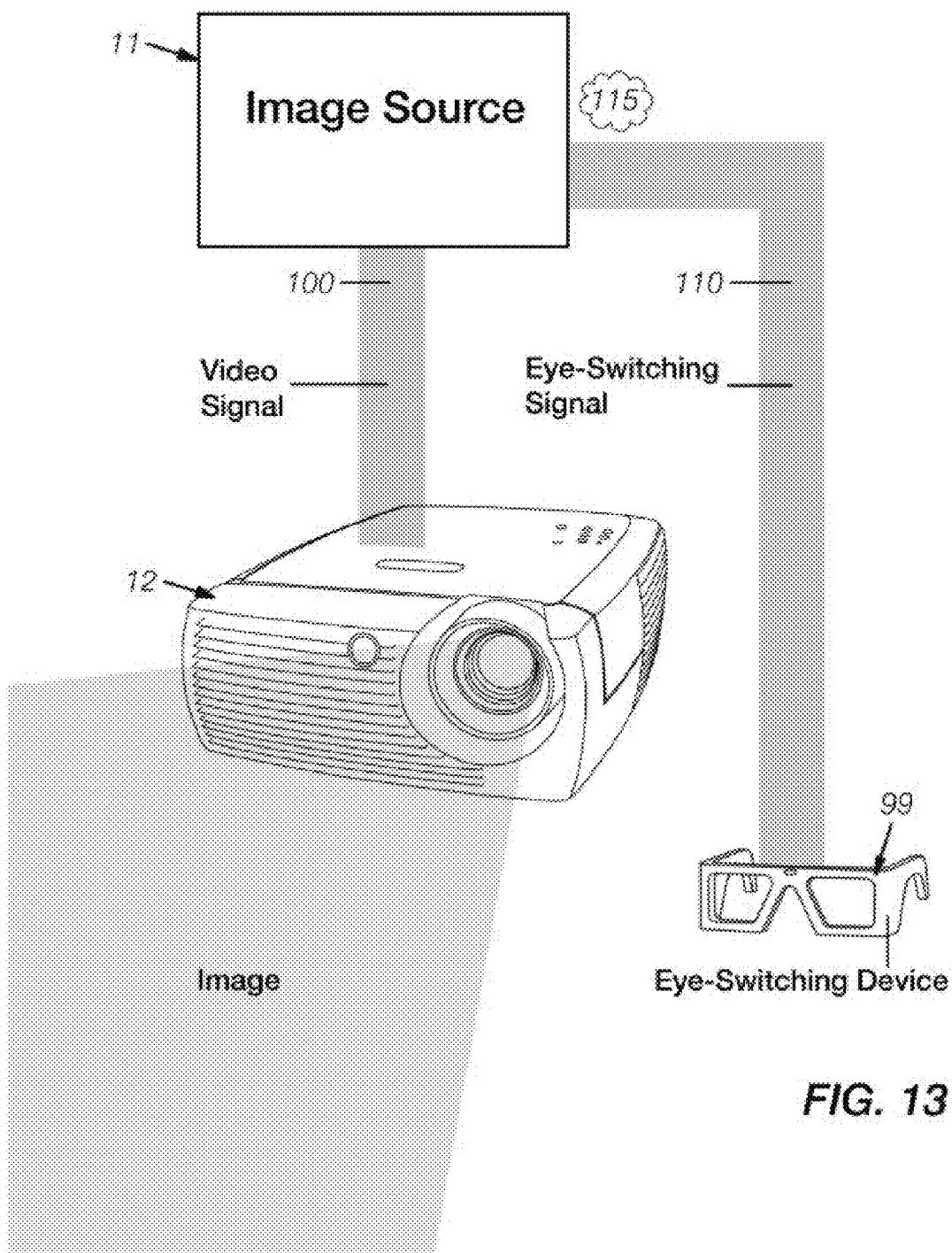
FIG. 13 is an illustration similar to the illustration shown in FIG. 12 showing the image source transmitting a video signal to the video projector and transmitting an eye-switching signal via a wired or wireless communication device such as an RF or IR transmitter to the eye-switching device.

FIG. 13 is an illustration similar to the illustration shown in FIG. 12 but with the image source 11 transmitting a video signal 100 to the video projector 12 and transmitting the eye-switching signal 110 directly to the eye-switching device 99. It should be understood that the eye-switching signal could be transmitted to an intermediate device 115, such as a wireless RF or IR transmitter which transmits the signal to the eye-switching device 99.

In an alternative embodiment, a projector and color switching device is used but the firmware to modify control of the DMD is replaced or supplemented by an image timing hardware and/or firmware loaded into the image source or intermediate device(s) located between the image source and the projector. The image timing hardware and/or firmware both modifies the signal to the eye-switching device so that the unstable transition phase occurs during the color switching device's non-critical segment and modifies the image source in order to control the production and delivery of the images synchronously with the eye-switching device. For optimum stereo operation, light needs to be discontinued from the projector for at least the duration of the eye-switching device's unstable transition phase. If the non-critical segment is non-transmissive, the process is complete in and of itself. If the non-critical segment is transmissive, the projector firmware must command the DMD to discontinue the light from the projector for at least the duration of the eye-switching device's unstable transition phase.

Figure 14:
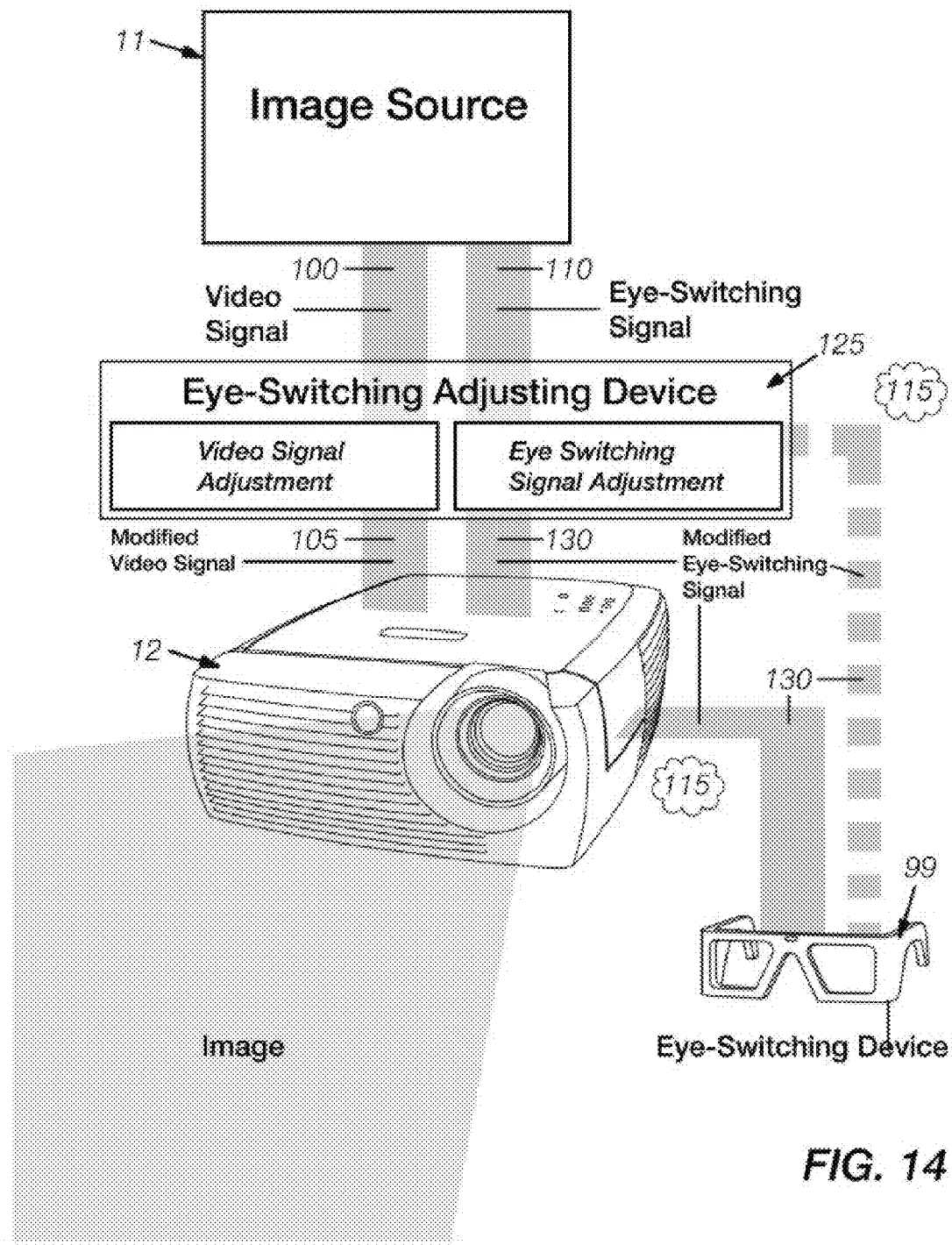
FIG. 14 is an illustration showing an image source transmitting a video signal and an eye-switching signal to an eye-switching adjusting device or program. The eye-switching adjusting device or program then forwards a modified eye switching signal to the projector that then transmits via a wired or wireless communication device such as an RF or IR transmitter, to the eye-switching device. Alternatively, the eye-switching adjusting device or program then forwards a modified eye-switching signal via a wired or wireless communication device such as an RF or IR transmitter, directly to the eye-switching device or program. The eye-switching adjusting device or program also modifies the image source video signal and transmits it to the projector in order to control the production and delivery of the images synchronously with the shutters.

FIG. 14 is an illustration showing an image source 11 transmitting the video signal 100 and eye-switching signal 110 to an intermediate eye-switching adjusting device or program 125. The eye-switching adjusting device or program 125 then forwards a modified eye switching signal 130 to the projector 12 that then transmits via a wired or wireless communication device, such as an RF or IR transmitter 115, to the eye-switching device 99. Alternatively, the eye-switching adjusting device or program 125 then forwards a modified eye-switching signal 130 via a wired or wireless communication device, such as a RF or IR transmitter 115, directly to the eye-switching device 99. The eye-switching adjusting device or program 125 also modifies the image source signal 100 and creates a modified signal 105 that is transmitted to the projector 12 in order to control the production and delivery of the images synchronously with the eye-switching device 99.

Figure 15:
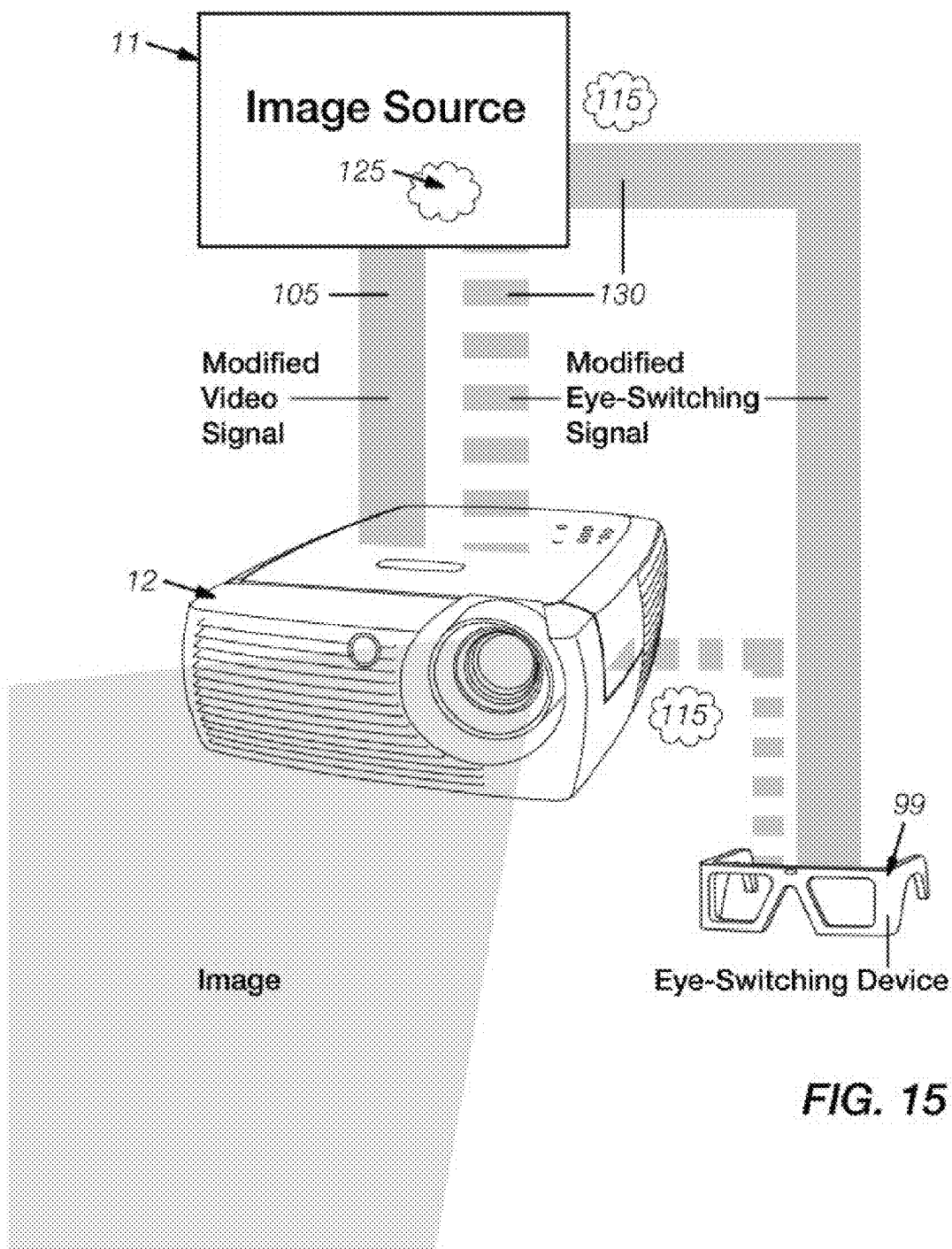
FIG. 15 is an illustration similar to the illustration shown in FIG. 14 but with the eye switching adjusting device or program built into or loaded into the memory of the image source. A modified eye-switching signal is then transmitted via a wired or wireless communication device, such as an RF or IR transmitter and eventually to the eye-switching device. The image source video signal is also modified by the eye-switching adjusting device or program and transmitted to the projector in order to control the production and delivery of the images synchronously with the shutters.

FIG. 15 is an illustration similar to the illustration shown in FIG. 14 but with the eye-switching adjusting device or program 125 built into or loaded into the memory of the image source 11. A modified eye-switching signal 130 is then transmitted via a wired or wireless communication device, such as an RF or IR transmitter 115 and eventually to the eye-switching device 99. A modified image source video signal 105 is produced by the eye-switching adjusting device or program 125 and transmitted to the projector 12 in order to control the production and delivery of the images synchronously with the eye-switching device 99.

As stated above, the system includes a means for selectively discontinuing transmission of light from the projector 12. In one embodiment, the means for selectively discontinuing transmission of light from the projector is a physical non-transmissive segment of the color wheel presented in front of the projector's light source when the unstable transition phase of the eye-switching device occurs. In another embodiment, the means for selectively discontinuing transmission of light from the projector is the coordinating software program resident in the projector and hardware referred to as firmware 9. The firmware 9 may be used to discontinue light from projector via control of the DMD during a transmissive or non-transmissive non-critical segment which has been aligned with the unstable transition phase of the eye-switching device 99.

Figure 16A:
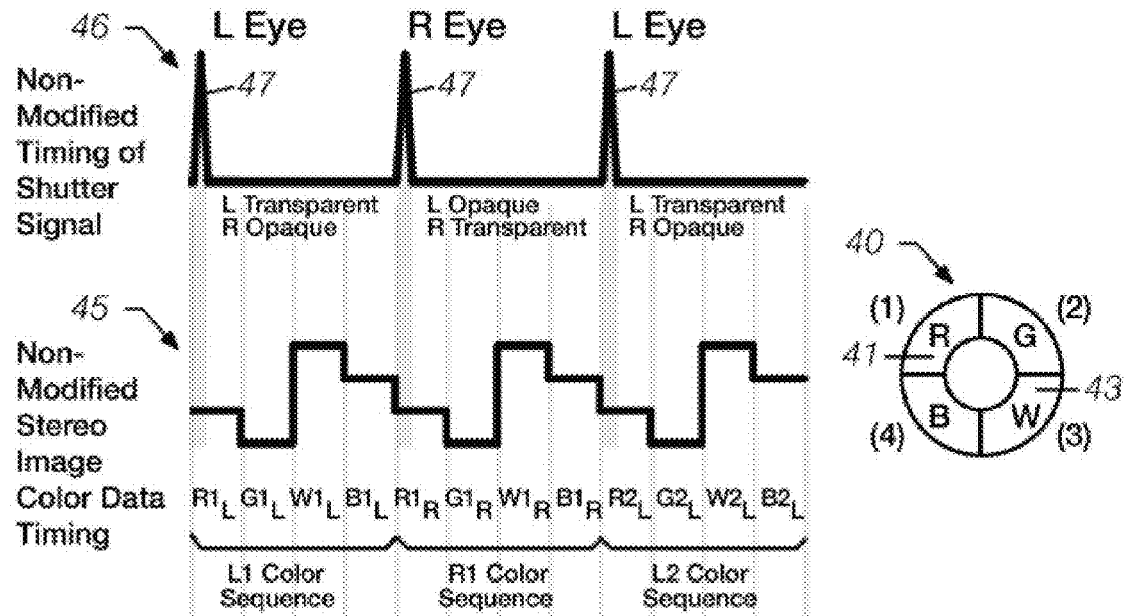
FIGS. 16A-E are illustrations that show an alternative embodiment of the system shown in FIGS. 14 and 15 that uses a 3D video projector and color switching device but with the firmware that modifies control of the DMD being replaced or supplemented by an image timing hardware and/or firmware loaded into the image source or intermediate device(s) located between the image source and the projector. The image timing hardware and/or firmware both modifies the signal to the eye-switching device so that the unstable transition phase occurs during a non-critical segment and modifies the image source in order to control the production and delivery of the images synchronously with the shutters.

FIG. 16A is an illustration showing the system utilizing a projector and a four color wheel 40 but without the firmware 9 referenced above to modify control of the DMD. Because control of the DMD is not modified, the unstable transition phase occurs during the Red segment 41 thus diminishing the Red color in the image as noted above.

Figure 16B:
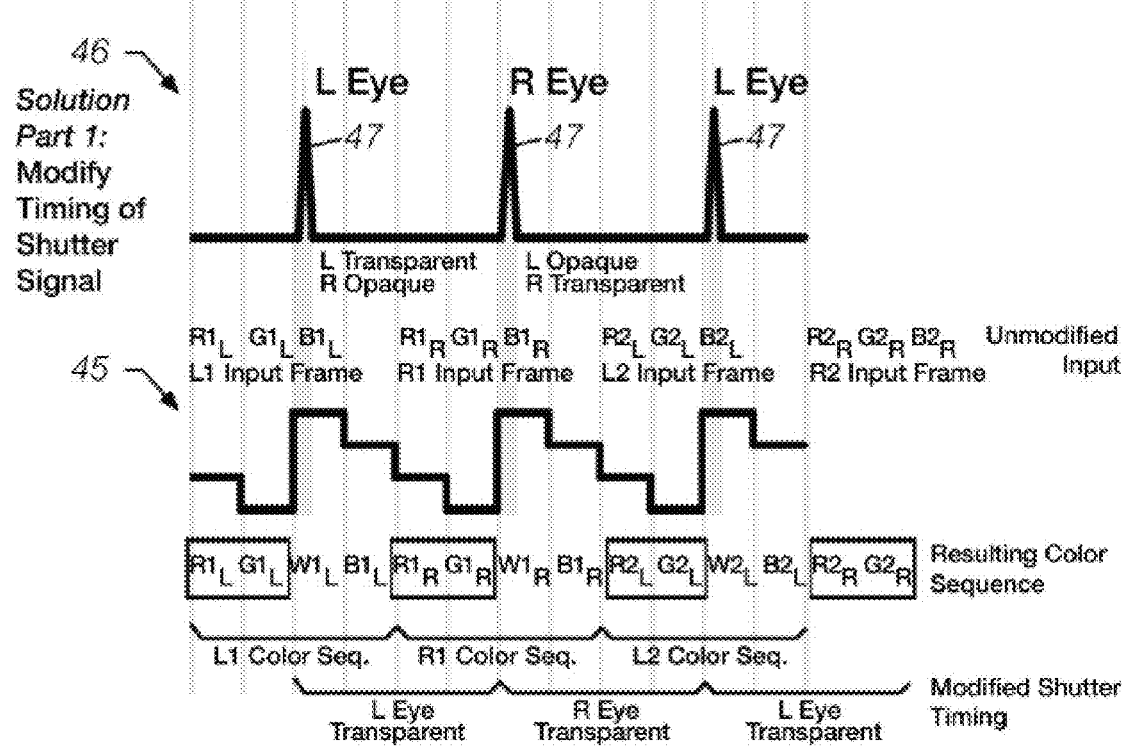

FIG. 16B is an illustration that shows the modified timing signal and modified image color data that occurs using the system depicted in FIG. 14 or 15. The eye-switching signal is shifted in time by the eye-switching adjusting device or program loaded into memory of the image source, the intermediary device or the projector. The device or program modifies the eye-switching signal so that the unstable transition phase occurs while the non-critical segment (in this case the White segment) is presented. As a result, some of the color data will now be out of phase with respect to the eye-switching signal.

Figure 16C:
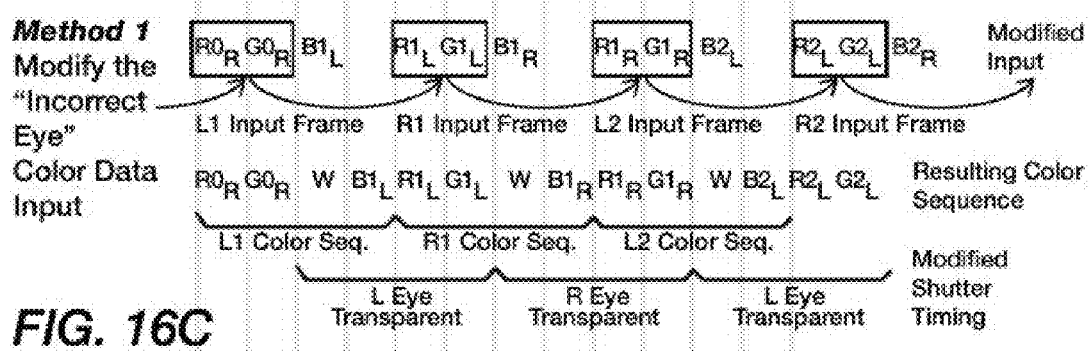

There are at least three approaches to fixing this problem through the modification of the image source video signal, all of which intentionally mix the left and right color data before input to the video projector, in order to be properly resolved after color sequencing by the video projector and filtering by the eye-switching device. The first approach, shown in FIG. 16C delivers phase corrected images synchronously with the modified eye-switching signal. The "incorrect eye" (out of phase) critical color data (in this case Red and Green) must be promoted to the next stereo input frame. This ultimately delivers uniform left and right color data from the same stereo frame to each eye during the corresponding eye-switching signal. Non-critical color data is typically irrelevant, since it is not typically an input color, but rather created by processing the critical input colors Red, Green and Blue.

Figure 16D:
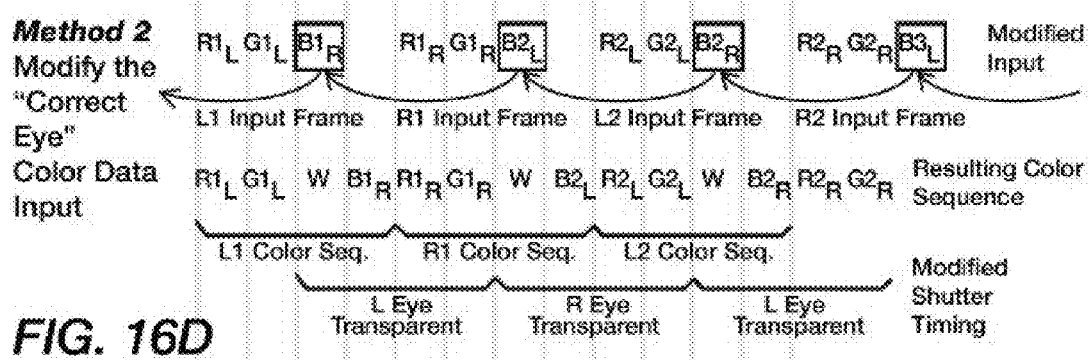

FIG. 16D illustrates a second approach whereby the "correct" (in phase) color data (in this case the Blue) is demoted or moved backwards by one stereo frame in order to deliver uniform (but polarity reversed) left and right color data from the same stereo frame to each eye during the corresponding eye-switching signal. The polarity of the eye-switching signal is then reversed.

Figure 16E:
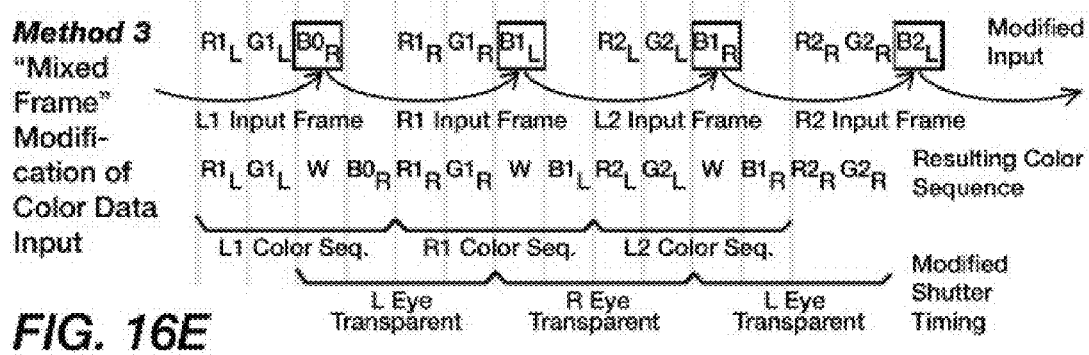

FIG. 16E illustrates a third approach, whereby either in phase or out-of-phase color data is rearranged in order to deliver uniform left and right color data from mixed stereo frames to each eye during the corresponding eye-switching signal. When necessary, the polarity of the eye-switching signal is then switched. In this case, the "correct" (in phase) Blue color data is promoted forward by one stereo input frame. Regarding 16E, other solutions may promote, demote, swap or otherwise move either "correct" or "incorrect" color data in order to deliver uniform left and right color data from mixed stereo frames to each eye during the corresponding eye-switching signal. While not an optimum solution, due to the mixing of stereo frame data—note that in the above example, while all critical color data is uniformly left or right eye data during the corresponding eye-switching signal, the blue color data presented to each eye is one frame out of phase with the other critical colors—it may be an acceptable solution for some non-critical applications.

Using the above described system, a method for improving the stereoscopic 3D image from the preferred embodiment of a single chip DMD video projector, comprises the following steps:
 a. selecting a DMD video projector that uses a color wheel to produce images for projection onto a viewing surface;
 b. selecting a color switching device and color sequencing firmware, said color switch device produces at least three critical color segments and optionally one or more non-critical color segment(s), said firmware capable of controlling the color sequence timing from said video projector such that the said non-critical color segment is utilized during the unstable transition phase of the eye-switching device, while discontinuing illumination of the non-critical color segment;
 c. selecting an eye-switching device capable of filtering multiple images transmitted by said video projector synchronous with an eye-switching control signal such that each eye sees a separate image;
 d. positioning said eye-switching device between said projector's light source and the viewer;
 e. operating said video projector to transmit an image onto a viewing surface for viewing by the user utilizing said eye-switching device; and,
 f. transmitting the eye-switching signal to the eye-switching device.

In compliance with the statute, the invention described herein has been described in language more or less specific as to structural features. It should be understood, however, that the invention is not limited to the specific features shown, since the means and construction shown is comprised only of the preferred embodiments for putting the invention into effect. The invention is therefore claimed in any of its forms or modifications within the legitimate and valid scope of the amended claims, appropriately interpreted in accordance with the doctrine of equivalents.

What is claimed is:

1. A video controller for synchronizing presentation of a plurality of images projected onto a display, comprising:
 a color switching device operable to select colors, each color comprising one of a fundamental color of red, green, or blue and a different non-fundamental color, and each color being selected for sequential presentation on the display for a fixed time segment in a color sequence;
 a light processing element coupled to the color switching device and operable to block and permit transmission of light in at least one color selected by the color switching device on to the display during each fixed time segment, the light comprising at least two streams of sequential images; and
 a synch signal generator in control of at least one of the color switching device, the light processing element and a viewing device of the display, and configured to modify at least one of the color sequence and a duration of one or more of the fixed time segments within the at least two streams of sequential images and of the blocked and transmitted light by the light processing element onto the display and of control signals to the viewing device of the display, the presentation of the blocked and transmitted light and of the control signals being timed in synchrony with the fixed time segments of the color sequence, wherein the blocked light is blocked for at least a portion of the non-fundamental color during a transition state of the viewing device.

2. A video controller according to claim 1, wherein the synchrony is determined based on factors comprising a duration of the transition state, a duration of the fixed time segments, a number of the fundamental colors, a number of non-fundamental colors, and a duration of the control signals.

3. A video controller according to claim 1, further comprising:
 one or more solid state colors generators comprised in the color switching device and each operable to generate each of the fundamental colors.

4. A video controller according to claim 3, further comprising one or more of:
 the one or more solid state color generators each operable to generate at least one non-fundamental color; and
 a physical light blocking barrier.

5. A video controller according to claim 1, further comprising:
 a color wheel comprised in the color switching device and divided into a plurality of light transmissive sections that correspond to each of the fundamental colors.

6. A video controller according to claim 5, further comprising one or more of:
 at least one light transmissive section comprised in the color wheel that corresponds to a non-fundamental color; and at least one light non-transmissive section comprised in the color wheel that comprises a physical light blocking barrier.

7. A video controller according to claim 1, further comprising:
a wearable device comprised in the viewing device and operable to obstruct and permit viewing of the display through the viewing device in response to the control signals, the transition states of the viewing device comprising at least one of a period coincident to the switching from blocking to permitting the viewing of the display and a period coincident to the switching from permitting to blocking the viewing of the display.

8. A video controller according to claim 7, further comprising:
a left eye viewing lens and a right eye viewing lens that are both comprised in the wearable eye-switching device and configured to be separately controlled to obstruct and permit viewing of the display through the viewing device.

9. A video controller according to claim 1, further comprising:
a spatial light modulator configured to assume a state corresponding to alternate between presentation of the two sequences of interleaved images on to the display.

10. A video controller according to claim 1, wherein the spatial light modulator comprises a digital micro-mirror device.

11. A video controller according to claim 1, further comprising:
the color switching device further configured to order the colors into a specific sequence.

12. A video controller according to claim 1, wherein the control signals comprise optical signals.

13. A video controller according to claim 1, wherein the at least two sequences of interleaved images collaboratively comprise one of a presentation of stereographic images and a presentation of multiview images.

14. A video controller according to claim 1, wherein the fundamental colors comprise red, green and blue.

15. A video projector for synchronizing presentation of a plurality of images projected onto a display, comprising:
a receiver operable to receive a video signal comprising at least two streams of sequential images;
a color switching device operable to select colors, each color comprising one of a fundamental color of red, green or blue and a different non-fundamental color, and each color being selected for sequential presentation on the display for a fixed time segment in a color sequence;
a light processing element operable to block and permit transmission of the light in at least one color selected by the color switching device on to the display during each fixed time segment, the light comprising the at least two streams of sequential images; and
a synch signal generator in control of at least one of the color switching device, the light processing element and a viewing device of the display, and configured to modify at least one of the color sequence and a duration of one or more of the fixed time segments within the at least two streams of sequential images and of the blocked and transmitted light by the light processing element onto the display and of control signals to the viewing device of the display, the presentation of the blocked and transmitted light and of the control signals being timed in synchrony with the fixed time segments of the color sequence, wherein the blocked light is blocked during at least a portion of the non-fundamental color during a transition state of the viewing device, the transition state comprising an interval occurring between a state permitting viewing of the display and a state preventing viewing of the display.

16. A video projector according to claim 15, further comprising at least one of:
a solid state color generator comprised in the color switching device and operable to generate each of the fundamental colors;
the solid state color generator further operable to generate at least one non-fundamental color; and
a physical light blocking barrier.

17. A video projector according to claim 15, further comprising at least one of:
a color wheel comprised in the color switching device and divided into a plurality of light transmissive sections that correspond to each of the fundamental colors;
the color wheel further comprising at least one light transmissive section that corresponds to a non-fundamental color; and
the color wheel further comprising at least one light non-transmissive section that comprises a physical light blocking barrier.

18. A video projector according to claim 15, further comprising:
a wearable device comprised in the viewing device and operable to obstruct and permit viewing of the display through the viewing device in response to the control signals.

19. A video projector according to claim 15, further comprising:
a spatial light modulator configured to assume a state corresponding to alternate between presentation of the two sequences of interleaved images on to the display.

20. A video controller according to claim 15, wherein the control signals comprise optical signals.

21. A video projection display system for synchronizing presentation of a plurality of images projected onto a display, comprising:
a display comprising a screen surface suitable for presentation of images;
a video projection unit configured to control production and delivery of the images on the display, comprising:
a receiver to receive a video signal as light for presentation on the display, the light comprising at least two streams of the images ordered into a sequence of appearance;
a color switching device operable to select colors, each color comprising one of a fundamental color of red, green or blue and a different non-fundamental color, and each color being selected for sequential presentation on the display for a fixed time segment in a color sequence;
a light processing element operable to block and permit transmission of the light in at least one color selected by the color switching device on to the display during each fixed time segment; and
a synch signal generator in control of at least one of the color switching device, the light processing element and a viewing device of the display, and configured to modify at least one of the color sequence and a duration of one or more of the fixed time segments within the at least two streams of sequential images and of the blocked and transmitted light by the light processing element on to the display and of control signals to the viewing device of the display, the presentation of the blocked and transmitted light and of the control signals being timed in synchrony with the fixed time segments of the color sequence, wherein the blocked light is blocked during at least a portion of the non-fundamental color during a transition state of the viewing device; and a wearable device comprising the viewing device and operable to obstruct and permit viewing of the display through the wearable eye-switching device in response to the control signals, the transition state comprising an interval occurring between a state permitting viewing of the display through the wearable eye-switching device and a state preventing viewing of the display through the wearable eye-switching device.

22. A video projection display system according to claim 21, further comprising:

a left eye viewing lens and a right eye viewing lens that are both comprised in the wearable eye-switching device and configured to be separately controlled to obstruct and permit viewing of the display through the viewing device.

23. A video projection display system according to claim 21, further comprising:

a spatial light modulator configured to assume a state corresponding to alternate between presentation of the two sequences of interleaved images on to the display.

24. A video projection display system according to claim 21, wherein the control signals comprise optical signals.

* * * * *